000
United States Patent
Callar et al.

(10) Patent No.: US 6,850,809 B1
(45) Date of Patent: Feb. 1, 2005

(54) METHODS, DEVICES AND SYSTEMS FOR SPLITTING AN INTEGRATED MANUFACTURING AND DISTRIBUTION PLAN FOR USE BY SEPARATE MANUFACTURING AND DISTRIBUTION EXECUTION SYSTEMS

(75) Inventors: Joseph Del Callar, Danville, CA (US); Michael Bloch, Mill Valley, CA (US); Alan Sarver, Belmont, CA (US); Byung-Hyun Chung, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/579,698

(22) Filed: May 26, 2000

Related U.S. Application Data

(60) Provisional application No. 60/136,727, filed on May 28, 1999.

(51) Int. Cl.[7] .................................................. G06F 17/60

(52) U.S. Cl. .......................... 700/96; 700/216; 705/8; 705/28

(58) Field of Search ........................ 700/95–102, 115, 700/116, 213–216, 106, 107; 705/7–10, 22, 26, 1, 28, 29

(56) References Cited

U.S. PATENT DOCUMENTS

| | | | | |
|---|---|---|---|---|
| 5,101,352 A | * | 3/1992 | Rembert ......................... | 705/8 |
| 5,311,438 A | * | 5/1994 | Sellers et al. .................. | 700/96 |
| 5,369,570 A | * | 11/1994 | Parad ............................. | 705/8 |
| 5,630,070 A | * | 5/1997 | Dietrich et al. ................ | 705/8 |
| 5,699,259 A | * | 12/1997 | Colman et al. ............... | 700/99 |
| 5,712,989 A | * | 1/1998 | Johnson et al. .............. | 705/28 |
| 5,854,746 A | * | 12/1998 | Yamamoto et al. ......... | 700/106 |
| 6,321,204 B1 | * | 11/2001 | Kazami et al. ................ | 705/7 |
| 6,345,259 B1 | * | 2/2002 | Sandoval ....................... | 705/7 |

* cited by examiner

Primary Examiner—Maria N. Von Buhr
(74) Attorney, Agent, or Firm—Young Law Firm, P.C.

(57) ABSTRACT

A consolidated plan splitting methodology sends distribution orders to a distribution execution system and planned production to a manufacturing execution system. Instructions from the planning system involving only movements of inventory within the distribution s system (e.g., warehouse to warehouse transfers) are passed directly to the distribution execution system. Instructions from the planning system involving movements of inventory where either the source or destination is in the manufacturing system causes a splitter located between the planning system and the distribution and manufacturing execution systems to carry out a decisional process wherein the movement of inventory is broken down into a selected number of distinct intermediate legs. Control of inventory balances is passed between the distribution and manufacturing execution systems as appropriate as the inventory moves from one execution system to another.

40 Claims, 2 Drawing Sheets

METHODS, DEVICES AND SYSTEMS FOR SPLITTING AN INTEGRATED MANUFACTURING AND DISTRIBUTION PLAN FOR USE BY SEPARATE MANUFACTURING AND DISTRIBUTION EXECUTION SYSTEMS

CROSS REFERENCE TO RELATED APPLICATIONS

This application claims priority from Provisional Application No. 60/136,727 filed May 28, 1999 and entitled "METHODS, DEVICES AND SYSTEMS FOR SPLITTING AN INTEGRATED MANUFACTURING AND DISTRIBUTION PLAN FOR USE BY SEPARATE MANUFACTURING AND DISTRIBUTION EXECUTION SYSTEMS", the disclosure of which is incorporated herewith.

BACKGROUND OF THE INVENTION

1. Field of the Invention

This invention relates generally to the field of industrial planning and execution systems. More particularly, the present invention relates to methods, devices and systems for splitting an integrated manufacturing and distribution plan into separate distribution and manufacturing plans usable by separate distribution and manufacturing execution computer systems.

2. Description of the Related Art

Many large enterprises operate a number of manufacturing facilities, often scattered across different countries or geographical areas. These manufacturing facilities may be independent of one another or may depend upon one another for a supply of intermediate product to be consumed in the production of finished goods. Manufacturing and distribution plans define and coordinate manufacturing and distribution activities for such enterprises over a specified period of time. The manufacturing and distribution planning information may be stored in separate databases, and the distribution execution system may be substantially or wholly independent of the manufacturing execution system.

Effective coordination of the operations of the manufacturing and distribution execution systems may require an integrated manufacturing and distribution plan. Such an integrated manufacturing and distribution plan, however, may not be effective to direct the activities of the separate manufacturing and distribution execution systems, each operating upon the separate manufacturing and distribution databases. This may be because the existence, location, capabilities and other characteristics of the manufacturing facilities (hereafter "plants") may not be known to the distribution execution system, which only directs inventory distribution events and not manufacturing events. Similarly, the existence, location, capacity and/or other characteristics of the warehouses used to store the finished or intermediate goods (inventory) may not be known to the manufacturing execution system, which only directs manufacturing events (e.g., a transformation of goods from one form to another).

There is, therefore, a need for some means for extracting separate manufacturing and distribution plans from an integrated manufacturing and distribution plan. Moreover, such separated manufacturing and distribution plans should be effective in directing the operations of the manufacturing and distribution execution systems, respectively.

SUMMARY OF THE INVENTION

It is an object of the present invention, therefore, to provide computer-implemented methods and systems for extracting separate manufacturing and distribution plans from an integrated manufacturing and distribution plan. In accordance with the above-described objects and those that will be mentioned and will become apparent below, the present invention includes computer-implemented methods, devices and systems for extracting separate manufacturing and distribution plans from an integrated manufacturing and distribution plan.

The consolidated plan splitting methodology according to an embodiment of the present invention sends distribution orders to the distribution execution system and planned production to the manufacturing execution system. The manufacturing execution system may only be responsible for warehouses and plants associated with manufacturing while the distribution execution system may only be responsible for warehouses associated with distribution, with a single warehouse set up to interface for the manufacturing plant. The plan splitting methodology, according to an embodiment of the present invention, determines whether the consolidated plan is intended for non-consumption distribution or consumption distribution by determining whether the planned destination of the goods is a manufacturing location or a distribution location. In order to aid the user in determining what inventory should be moved from a plant to a distribution system, a manufacturing distribution report may be published. In order to aid the user in determining what inventory should be moved to a plant from the distribution system, specific vehicle loads may be determined.

Instructions from the planning system involving only movements of inventory within the distribution system (e.g., warehouse to warehouse transfers) may be passed directly to the distribution execution system. Instructions from the planning system involving movements of inventory where either the source or destination is in the manufacturing system causes a splitter located between the planning system and the distribution and manufacturing execution systems to carry out a decisional process wherein the movement of inventory is broken down into a number of intermediate legs. Control of inventory balances is passed between the distribution and manufacturing execution systems as appropriate, as the inventory moves from one execution system to another.

According to an embodiment of the present invention, a computer-implemented method of splitting an integrated manufacturing and distribution plan stored in a planning system into a plan for distribution of inventory and a separate manufacturing plan, the manufacturing plan being executable by a manufacturing execution system and the distribution plan being executable by a distribution execution system, includes steps of reading the integrated plan from the planning system; discriminating between a planned manufacturing event and a distribution order in the integrated plan; incorporating the planned manufacturing event directly into the manufacturing plan and routing the distribution order to at least one of the manufacturing and distribution plans according to splitting logic adapted to operate on the distribution order.

The splitting logic may route the distribution order to the manufacturing and/or distribution plans, depending upon a source and a destination of the inventory. The incorporating step may include the step of selectively relinquishing control of the planned manufacturing event from the planning system to the manufacturing execution system. The routing step may further include the step of selectively relinquishing control of the inventory from the planning system to the distribution execution system and/or the manufacturing execution system. The splitting logic may implement the sequential steps of determining whether the distribution order specifies a transfer of inventory from a manufacturing plant to a distribution warehouse, from a distribution warehouse to a manufacturing warehouse and between distribution warehouses. When the distribution order includes a transfer of inventory from a manufacturing plant to a distribution warehouse, control of the inventory may be transferred from the planning system to the distribution execution system. A step of notifying the distribution execution system of the transferred control of the inventory may also be carried out. When the distribution order includes a transfer of inventory from a distribution warehouse to a manufacturing plant, control of the inventory may be transferred from the planning system to the manufacturing execution system. Steps of notifying the manufacturing execution system that the transferred inventory is incoming and of notifying the distribution execution system that the transferred inventory is outgoing may also be carried out. When the distribution order includes a transfer of inventory between distribution warehouses, the method may further include the steps of generating an inventory distribution order detailing a source distribution warehouse and a destination distribution warehouse. A step of storing the manufacturing plan in a manufacturing database administered by the manufacturing execution system may also be carried out, as may be a step of storing the distribution plan in a distribution database administered by the distribution execution system. The integrated manufacturing and distribution plan may include a record of recommended shipments, vehicle loads and/or corresponding planned arrival dates of the recommended shipments necessary to effectuate the distribution and/or manufacturing plans and the splitting logic may selectively forward at least a portion of the record to the distribution execution system and/or the manufacturing execution system. The splitting logic may forward the record of recommended shipments and vehicle loads to the distribution execution system and may forward the corresponding planned arrival dates to the manufacturing execution system.

According to another embodiment thereof, the present invention is also a computer system adapted to split an integrated manufacturing and distribution plan into a plan for distribution of inventory and a separate manufacturing plan, comprising: a planning computer system adapted to store the integrated manufacturing and distribution plan; a manufacturing execution computer system adapted to store and execute the manufacturing plan; a distribution execution computer system adapted to store and execute the distribution plan, and a splitter configured to read the integrated plan from the planning computer system, to discriminate between a planned manufacturing event and a distribution order in the integrated plan, to incorporate the planned manufacturing event directly into the manufacturing plan and to route the distribution order to at least one of the manufacturing and distribution plans according to splitting logic adapted to operate on the distribution order.

The present invention may also be viewed as a machine readable medium having stored thereon data representing sequences of instructions which, when executed by a computer system, causes the computer system to split an integrated manufacturing and distribution plan stored in a planning system into a plan for distribution of an inventory and a separate manufacturing plan, the manufacturing plan being executable by a manufacturing execution system and the distribution plan being executable by a distribution execution system, by carrying out the steps of: reading the integrated plan from the planning system; discriminating between a planned manufacturing event and a distribution order in the integrated plan; incorporating the planned manufacturing event directly into the manufacturing plan and routing the distribution order to at least one of the manufacturing and distribution plans according to splitting logic adapted to operate on the distribution order.

BRIEF DESCRIPTION OF THE DRAWINGS

For a further understanding of the objects and advantages of the present invention, reference should be made to the following detailed description, taken in conjunction with the accompanying figures, in which.

DESCRIPTION OF THE PREFERRED EMBODIMENTS

Figure 1:
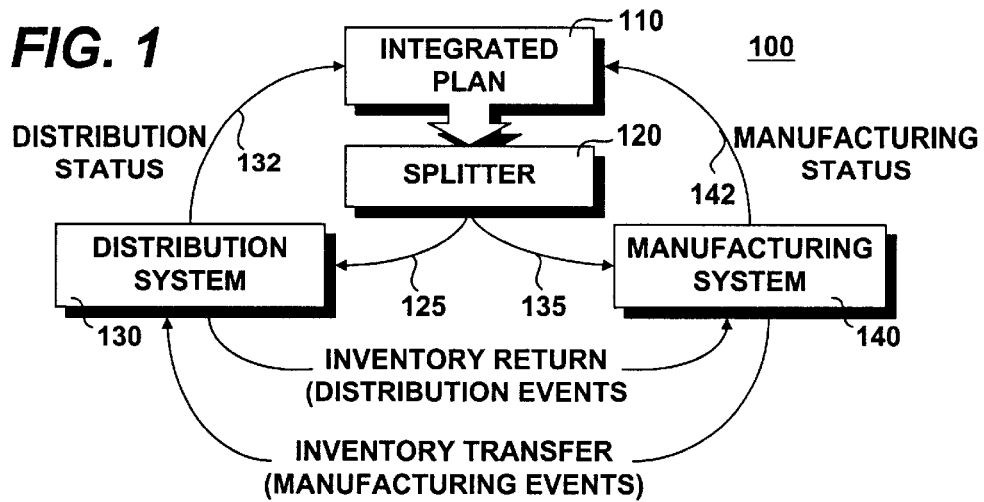
FIG. 1 is a functional block diagram of a manufacturing and distribution planning system according to an embodiment of the present invention, illustrating the manner in which separate manufacturing and distribution plans may be generated from an integrated manufacturing and distribution plan.

| Glossary | |
|---|---|
| Warehouse | A physical or logical storage area that maintains inventory balances. Warehouses which store inventory only for distribution purposes (as opposed to for consumption purposes in a batch) are set up in the distribution execution system only. Warehouses that store inventory only for manufacturing purposes are set up in the manufacturing execution system only. |
| Plant | An entity in which production activities (batches) are executed. Defined in the manufacturing execution system as an organization that has no ownership of inventory. Also defined as a planning system location. |
| Consumption and Replenishment Warehouses | A warehouse from which a specific item is consumed by a specific plant is known as a consumption warehouse; A warehouse to which a specific item is replenished into from a specific plant is known as a replenishment warehouse. Consumption and replenishment are not attributes of a warehouse; they are defined by the relationship between a plant, an item and; warehouse. For planning purposes a single default consumption and replenishment warehouse must be defined for each item included in a batch; during execution of batch transactions the defaults maybe overridden. |
| Demand | A requirement for purchase, distribution or production of a quantity of a particular kind of inventory in response to a customer request or other production or distribution demand. |
| Dependent Demand | Demand for a particular item is said to be dependent when the cause of the demand is a distribution or manufacturing event that requires the item. |
| Independent Demand | Demand for a particular item is said to be independent when the cause of the demand is an external source, such as customer order. |
| Replenishment Order | A recommendation for distribution in satisfaction of some given demand. |
| Critical Item | A raw material, intermediate product or finished good of limited availability which is therefore appropriate to be considered as part of the manufacturing and distribution plans. |

FUNCTIONAL OVERVIEW

According to an embodiment of the present invention, the manufacturing execution system may be configured as the single application for maintaining inventory balances of that inventory expected to be consumed in production at a plant location, and for recording transactions and updating inventory balances to record the consumption of ingredients and yield of products as a result of a production event (batch). The manufacturing execution system may also be configured as the single application for generating material requirements to meet given production needs for non-critical materials, and for recommending batches to produce non-critical intermediate items which will be consumed in a further batch at the same plant location, as well as batches required to meet net demand for critical intermediate items, as determined by the integrated plan (planned orders sent to the manufacturing execution system as a forecast). The manufacturing execution system may also recommend raw material purchases necessary to meet production requirements.

The distribution execution system, on the other hand, may be configured to be responsible for all sales order processing and order fulfillment, as well as executing replenishment orders of items (e.g., movement of inventory) within the plant and distribution network, other than replenishments via production or outside purchases. The distribution execution system may also be responsible for generating pick, pack, and ship paperwork, and for receiving at the destination location. This may include the shipping and receiving between separate plant locations of materials stored in manufacturing execution system consumption warehouses that are planned by the integrated manufacturing and distribution execution system.

The integrated manufacturing and distribution plan (created by a planning system, shown in FIG. 2) may specify enterprise-wide planning of distributable and critical materials and may recommend shipments of inventory within the plant and distribution network. The is integrated manufacturing and distribution plan may determine net manufacturing requirements to satisfy unmet demand within the network. These requirements may be in the form of planned orders sent to the manufacturing execution system. The planning system may also send net external demand (total demand less dependent demand within a plant) to the manufacturing execution system, which creates a forecast record at an item's replenishment warehouse.

FIG. 1 is a functional block diagram of a manufacturing and distribution planning system 100 according to an embodiment of the present invention, illustrating the manner in which separate manufacturing and distribution plans may be generated from an integrated manufacturing and distribution plan. As shown therein, an integrated manufacturing and distribution plan 110 may be created by receiving (inventory) status information 132 from the distribution execution system 130 and (inventory) status information 142 from the manufacturing execution system 140. The planning system (reference 210 in FIG. 2) may apply a number of item and inventory-specific rules to the distribution status information 132 and to the manufacturing status information 142 in creating the integrated manufacturing and distribution plan 110. The integrated plan 110 includes all of the distribution events and all of the manufacturing events that are necessary to meet specific demands at specific dates.

According to an embodiment of the present invention, the distribution execution system 130 is an execution system that operates on a separate distribution plan. Similarly, the manufacturing execution system 140 is an execution system that operates on a separate manufacturing plan. According to the present invention, an intelligent splitter 120 is provided between the planning system that generates the integrated plan 110 and the manufacturing and distribution execution systems 140, 130 to determine which components of the integrated plan 110 should be included in the distribution plan 125 to be routed to (and appropriately formatted for use by) the distribution execution system 130 and which components of the integrated plan 110 should be included in the manufacturing plan 135 to be routed to (and appropriately formatted for use by) the manufacturing execution system 140. As shown in FIG. 1, inventory returns (distribution events) may flow from the distribution execution system 130 to the manufacturing execution system 140 and inventory transfers (manufacturing events) may flow from the manufacturing execution system 140 to the distribution execution system 130.

Figure 2:
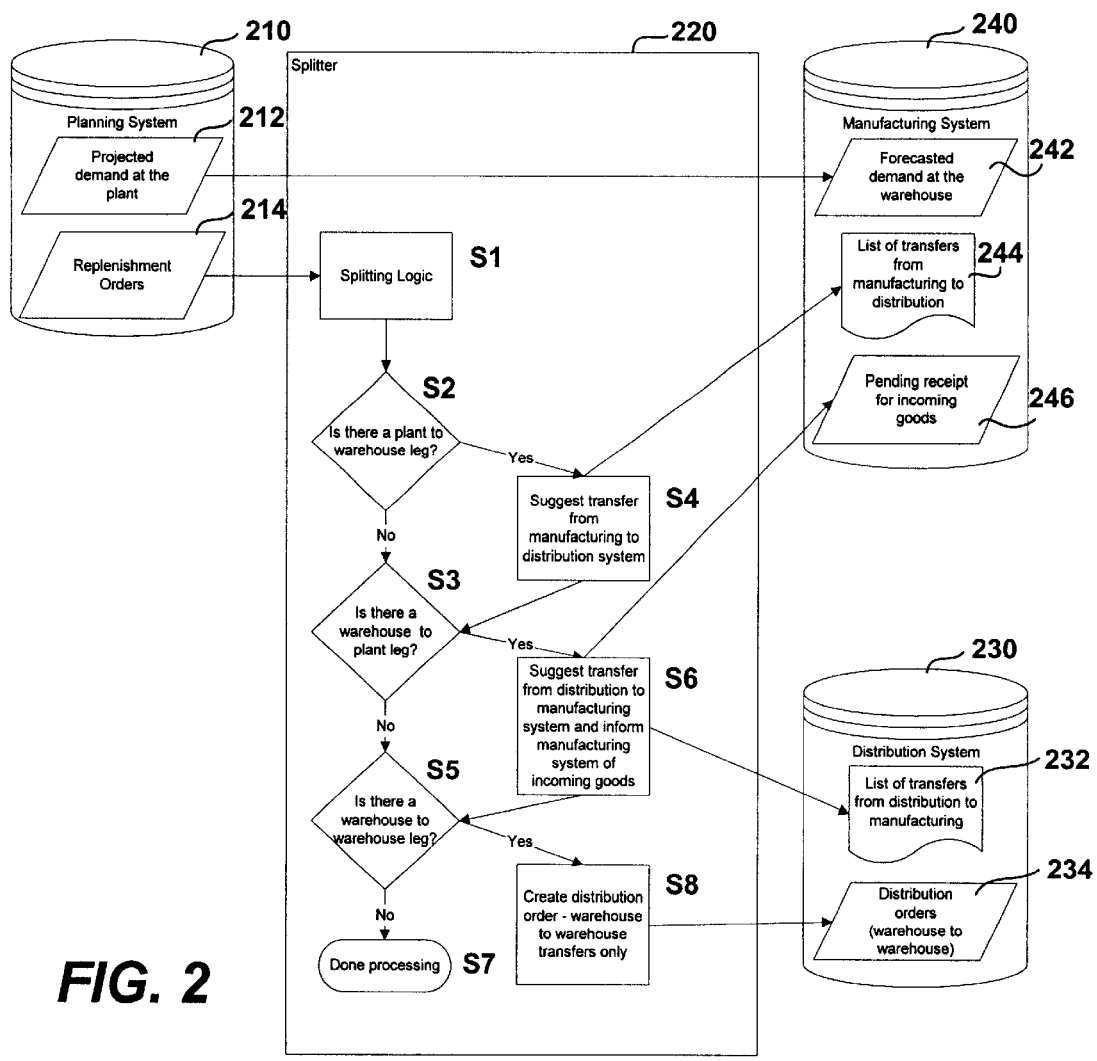
FIG. 2 is a combined block diagram and flowchart illustrating the manner in which separate manufacturing and distribution plans may be generated and sent to respective manufacturing and distribution execution systems, according to an embodiment of the present invention.

FIG. 2 is a combined block diagram and flowchart illustrating the manner in which separate manufacturing and distribution plans 140, 130 may be generated and sent to respective manufacturing and distribution execution systems, according to an embodiment of the present invention. The planning system 210 includes (stores or otherwise has access to) an integrated manufacturing and distribution plan, as shown at reference numeral 110 in FIG. 1. This integrated plan 110 may include both planned orders (manufacturing events) and planned arrivals (distribution events, each being a movement of some quantity of a selected item (inventory) from a source location to a destination location at a specific date). As shown in FIG. 2, the projected demand at the plant 212, being a planned order, may be directly routed to the manufacturing execution system 240, which views the plan as a forecasted demand at the warehouse, as shown at reference 242. The splitter 220, therefore, does not modify the planned orders from the planning system 210. For replenishment orders 214, however, the splitter 220 may selectively relinquish control over the inventory designated in the planned arrivals to the manufacturing execution system 240. The integrated plan 110 from the planning system 210, however, may operate on both manufacturing locations (plants) and distribution locations (warehouses). Moreover, the distribution execution system 230 "knows" (e.g., controls) only of inventory in warehouses or in transit between warehouses, whereas the manufacturing execution system 240 "knows" (e.g., controls) only inventory in manufacturing plants. Thus, when the integrated plan 110 from the planning system 210 recommends a movement of inventory between a warehouse and a plant, for example, the distribution execution system 230 must relinquish control of the inventory to the manufacturing execution system 240. This functionality is implemented by the splitter 220 in a variety of instances, to be detailed below.

As shown in the flow chart portion of FIG. 2, replenishment orders 214 are filtered through splitting logic S1 and are selectively split into at least one of three legs, as appropriate.

The three legs are, in no particular order:

1. a distribution warehouse to distribution warehouse leg.

2. a manufacturing plant to distribution warehouse leg.

3. a distribution warehouse to manufacturing plant leg.

The leg(s) that the splitter logic S1 will divide a replenishment order 214 into will depend on the source and destination of the replenishment order, as follows:

| Source Location | Destination Location | Output |
|---|---|---|
| Distribution Warehouse | Distribution Warehouse | distribution warehouse to distribution warehouse leg |
| Distribution Warehouse | Manufacturing Plant | distribution warehouse to distribution warehouse leg<br>distribution warehouse to manufacturing plant leg |
| Manufacturing Plant | Distribution Warehouse | manufacturing plant to distribution warehouse leg<br>distribution warehouse to distribution warehouse leg (only if the source distribution warehouse is different from the target distribution warehouse) |
| Manufacturing Plant | Manufacturing Plant | manufacturing plant to distribution warehouse leg<br>distribution warehouse to distribution warehouse leg (only if the source distribution warehouse is different from the target distribution warehouse)<br>distribution warehouse to manufacturing plant leg |

Indeed, if the replenishment order 214 includes movement of inventory (intermediate or finished goods, for example), from a plant to a warehouse, as shown at step S2, the manufacturing execution system 240 (which only "knows" about plants) should relinquish and 10 transfer control of the inventory to be moved to the distribution execution system 230 (which only "knows" about warehouses), as shown at step S4. In turn, the manufacturing execution system 240 may update a list of transfers from manufacturing to distribution, as shown at 244. After carrying out step S4 as detailed above, or if it is determined in step S2 that there is no plant to warehouse leg, it is then determined, in step S3, whether the replenishment order 214 calls for a warehouse to plant leg; e.g., a movement of inventory from a distribution warehouse to a manufacturing plant. If yes, then the splitter 220 should recommend a transfer of control of the involved inventory from the distribution execution system 230 to the manufacturing execution system 240 and the manufacturing execution system 240 should be informed of the incoming inventory (step S6), which is seen by the manufacturing execution system 240 as a pending receipt for incoming goods 246. The distribution execution system 230 then creates or updates a list 232 of transfers from the distribution execution system 230 to the manufacturing execution system 240. Whether or not a warehouse to plant leg has been detected in step S3, it is determined, in step S5, whether the replenishment order 214 calls for a warehouse to warehouse leg. If so, then splitter logic SI need not cause the distribution execution system 230 to relinquish control of the involved inventory, as this warehouse to warehouse transfer may be considered purely a distribution event. A distribution order may then be created, as noted in step S8 and reference numeral 234 within the distribution execution system 230. If there is no warehouse to warehouse transfer at step S5, the splitter 220 may be done processing or may have encountered an error, such as an error in the replenishment orders 214, for example.

The distribution execution system 230 executes the replenishment orders 214 generated from the planning system 210 via the splitter 220. For those replenishment orders 214 tagged for automatic return to the manufacturing execution system 240 (indicating the final move within the distribution warehouse network), the distribution execution system may automatically return the inventory and delete the appropriate pending receipt transaction.

According to an embodiment of the present invention, the splitter 220 must manage a transfer of control from the distribution execution system 230 to the manufacturing execution systems 240 of any inventory that must be moved from one location to another via the distribution execution system 230 that either starts in a plant or ends in a plant. Therefore, plant to warehouse, plant to plant, and warehouse to plant inventory transfers are instances where the splitter 220 must resolve potential conflicts over the control of the inventory, in the manner detailed above. Warehouse to warehouse inventory transfers do not require the particular attention of the splitter 220, as the control of the involved inventory never leaves the distribution execution system 230. Indeed, the only replenishment orders 214 that the distribution execution system 230 alone could execute are those with a distribution warehouse as both source and destination locations. Replenishment orders 214 which do not have distribution warehouses as both source and destination are intended to identify inventory transfers required between the manufacturing and the distribution execution system systems 240, 230. The splitter 220, therefore, may be involved whenever there is movement of a "distributable intermediate product"; that is, product that is produced by the manufacturing execution system 240, which can be consumed by the manufacturing execution system 240 into further production-related activities and can also be distributed (either moved to a different plant or warehouse or sold to a customer).

As shown in FIG. 2, each of the three execution systems (Planning 210, Distribution 230 and Manufacturing 240) may be stored in its own database, with its own inventory. The inventory that is controlled by and visible to the manufacturing execution system 240 may include raw materials and intermediate products to be consumed in the specified manufacturing process. The inventory that is controlled by and visible to the distribution execution system 230 may include those finished goods and intermediate products that are available to be distributed (to warehouses and/or plants). The inventory that is controlled by and visible to the planning execution system 210 may include all raw materials, intermediate products, and finished goods available for either manufacturing or distribution. Thus, according to an embodiment of the present invention, the manufacturing execution system 240 does not need (or have) any access to information regarding the inventory that is controlled by the distribution execution system 230, and the distribution execution system 230 does not need (or have) any access to information regarding the inventory that is controlled by the manufacturing execution system 240. In contrast, the planning execution system 210 needs (and has) visibility to the inventories controlled by both the distribution and manufacturing execution systems 230, 240.

According to an embodiment of the present invention, inventory control may be strictly based on which execution system 230, 240 maintains the inventory balance. The manufacturing execution system 240 may have no visibility to those inventory balances that are expected to be distributed, and the distribution execution system 230 may have no visibility to those balances that are expected to be consumed in production. The planning system 210, however, may have visibility to inventory in both execution systems 230, 240.

An embodiment of the present invention calls for support for full warehouse location control within both the manufacturing execution system 240 and the distribution execution system 230, based on each execution system's current functionality. Warehouse location control may not be supported on moves between the two execution systems 230, 240; default receiving locations should be established in each location controlled warehouse for inter-system inventory transfers of location controlled items.

The planning system 210 may have visibility to inventory balances of critical items in the manufacturing execution system 240. The manufacturing execution system 240 balances may be visible as either on hand inventory or scheduled receipts (in cases where lots are on hold with a future hold expiration date).

The planning system 210 may include a set of sourcing and distribution rules that determine where a specific location sources inventory from and how inventory is moved from one location to another. The distribution execution system 230 may send the planning system 210 unfulfilled orders for independent demand. A limited Bill Of Material (BOM) may be kept in the planning system 210 to include all subordinate critical materials, providing the ability for the planning system 210 to calculate supply requirements for critical ingredients (dependent demand) of finished goods as well as the finished goods themselves. Based on its visibility of on-hand and pending supply of inventory in the manufacturing execution system 240 (actually seen by the planning system 210 as inventory at a plant) and distribution warehouses, and in-transit inventory between distribution warehouses, the planning system 210 may create recommended shipments (replenishment orders) for independent demand and distribution demand (dependent demand that is sourced from outside the plant) which can be is satisfied from inventory existing (or planned to exist by demand date) in the network. Independent and distribution demand which can not be satisfied by inventory in the network may be sent to the manufacturing execution system 240 as a forecast (dependent demand is excluded because the manufacturing execution system 240's internal planning engine may derive dependent demand based on formula requirements), which places demand on a Master Production Schedule (MPS) for those items within the manufacturing execution system 240. Additionally, the planning system 210 may provide a Leveled Production Plan (Constrained Planned Orders) to the manufacturing execution system 240. The Leveled Production Plan may include orders to meet Independent, Dependent, and Distribution Demand which can't be satisfied by existing inventory within the network, and may serve as a source of supply to the manufacturing execution system 240's MPS to satisfy demand placed by the forecasts.

Previous to the current invention, the planning system 210 only had visibility to and planned for distribution of finished goods inventory in the distribution execution system 230, so all the planning system 210 planned replenishment orders were for movements within the distribution execution system 230. According to an embodiment of the present invention, however, the planning system 210 may also determine critical intermediate and raw material inventory requirements, and may have visibility to inventory in the manufacturing execution system 240. Since the planning system 210 may have visibility to manufacturing execution system 240 inventory, it may make recommendations for internal shipments that transfer inventory between the manufacturing execution system 240's warehouses (which the planning system 210 sees as a move between two plant locations) and/or from a manufacturing execution system 240 warehouse (seen by the planning system 210 as a plant location) to a distribution warehouse or vice-versa.

In cases where both the source and destination of a recommended shipment are distribution warehouses, the splitter 220 may pass the recommendation to the distribution execution system 230 unmodified. In other cases, when either the source or destination (or both) is a manufacturing warehouse (seen by the planning system 210 as a plant location), the splitter 220 may recommend manual (logical) movements of inventory from the manufacturing execution system 240 to the distribution execution system 230 (if the source is a manufacturing warehouse), and physical movements between distribution warehouses. If the destination of a planning system 210 planned transfer is a manufacturing warehouse, the splitter 220 may tag the distribution physical replenishment order with an indicator that will trigger the distribution execution system 230 to transfer the inventory to the co-located manufacturing warehouse automatically upon receipt of the actual transfer at the distribution warehouse destination. Additionally the splitter 220 may create a pending receipt transaction in the manufacturing execution system 240 (identified with the same ID as the replenishment order) to offset the demand which triggered that shipment. In cases where the source of an internal shipment is a manufacturing warehouse, the splitter 220 may output the recommendation to a report, and the inventory may be manually transferred from the manufacturing execution system 240 to the distribution execution system 230. Since the planning system 210 sees manufacturing execution system 240 inventory in a single planning system 210 (plant) location regardless of which manufacturing warehouse it is in, when the planning system 210 recommends a movement from a plant location, the splitter 220 may determine the specific manufacturing warehouses to be the source and destination of the manual transfer.

When the distribution execution system 230 updates the planning system 210 with the status of a replenishment order (shipped, in-transit, received), the planning system 210 may use views provided by the splitter 220 to determine which original planning system 210 recommendation is being acted upon by the distribution execution system 230 (since it will have been modified by the splitter 220).

The planning system 210, according to an embodiment of the present invention, may send all Vehicle Loads, all Recommended Shipments, and all Planned Arrivals (adjusted for the Vehicle Loads and Recommended Shipments) to the splitter 220. All approved Vehicle Loads may be passed to the distribution execution system 230 incrementally, giving the Distribution Execution System 230 responsibility for that distribution work which is ready to execute. All Vehicle Loads, Recommended Shipments, and adjusted Planned Arrivals may be passed to the manufacturing execution system 240, to represent Planned future Supply. Not all Vehicle Loads, however, may be ready for execution at the time that the planning system 21,0 exports its data. As additional Vehicle Loads are subsequently approved for execution, the planning system 210 may export them to the splitter 220. A subset of the splitter 220 may be invoked to process only the newly approved Vehicle Loads. Newly Approved Vehicle Loads may be sent to the distribution execution system 230, after the planning system 210 exports its approved vehicle loads. The splitter 220 may then send all Vehicle Loads that have not been previously exported to the distribution execution system 230.

HARDWARE OVERVIEW

Figure 3:
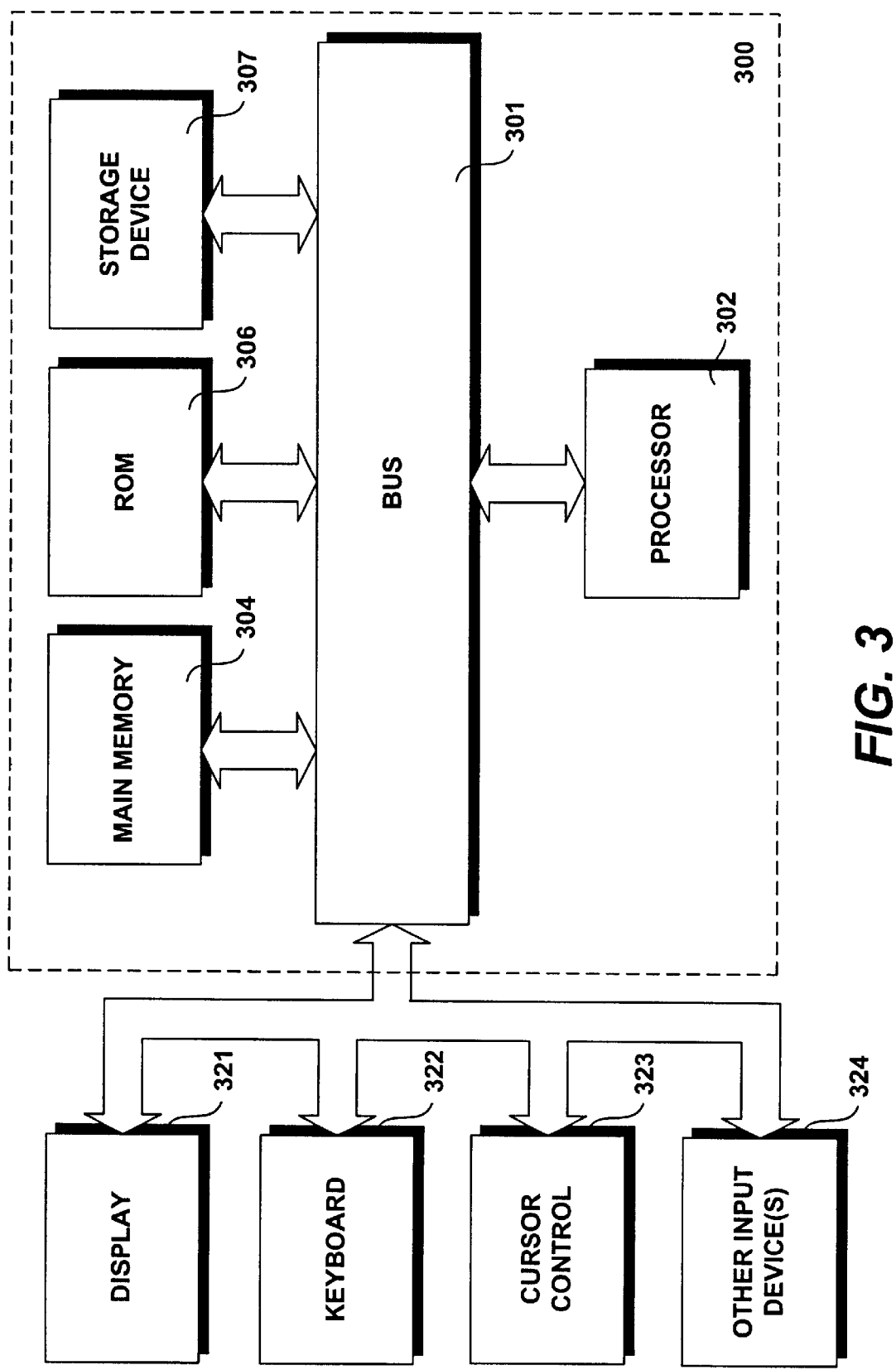
FIG. 3 illustrates a block diagram of a computer with which an embodiment of the present invention may be implemented.

FIG. 3 illustrates a block diagram of a computer 300 with which an embodiment of the present invention may be implemented. Computer system 300 includes a bus 301 or other *X communication mechanism for communicating information, and a processor 302 coupled with bus 301 for processing information. Computer system 300 further comprises a random access memory (RAM) or other dynamic storage device 304 (referred to as main memory), coupled to bus 301 for storing information and instructions to be executed by processor 302. Main memory 304 also may be used for storing temporary variables or other intermediate information during execution of instructions by processor 302. Computer system 300 also includes a read only memory (ROM) and/or other static storage device 306 coupled to bus 301 for storing static information and instructions for processor 302. A data storage device 307, such as a magnetic disk or optical disk, is coupled to bus 301 for storing information and instructions.

Computer system 300 may also be coupled via bus 301 to a display device 321, such as a cathode ray tube (CRT), for displaying information to a computer user. An alphanumeric input device 322, including alphanumeric and other keys, is typically coupled to bus 301 for communicating information and command selections to processor 302. Another type of user input device is cursor control 323, such as a mouse, a trackball, or cursor direction keys for communicating direction information and command selections to processor 302 and for controlling cursor movement on display 321.

The present invention is related to the use of computer system 300 to split an integrated manufacturing and distribution system plan from a planning system 210 into separate manufacturing and distribution plans 135, 125 for use by separate manufacturing and distribution execution systems 240, 230, respectively. According to one embodiment, the methods according to the present invention are implemented by one or more computer systems 300 in response to processor(s) 302 executing sequences of instructions contained in memory 304. Such instructions may be read into memory 304 from another computer-readable medium, such as data storage device 307. Execution of the sequences of instructions contained in memory 304 causes processor(s) 302 to perform the process steps that are described above. In alternative embodiments, hard-wired circuitry may be used in place of or in combination with software instructions to implement all or selected portions of the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention.

We claim:

1. A computer-implemented method of splitting an integrated manufacturing and distribution plan stored in a planning system into a plan for distribution of an inventory and a separate manufacturing plan, the manufacturing plan being executable by a manufacturing execution system and the distribution plan being executable by a distribution execution system, the method comprising the steps of:
   reading the integrated plan from the planning system;
   discriminating between a planned manufacturing event and a distribution order in the integrated plan;
   incorporating the planned manufacturing event directly into the manufacturing plan, and
   routing the distribution order to at least one of the manufacturing and distribution plans according to splitting logic adapted to operate on the distribution order.

2. The method of claim 1, wherein the splitting logic routes the distribution order to said at least one of the manufacturing and distribution plans depending upon a source and a destination of the inventory.

3. The method of claim 1, wherein the incorporating step includes the step of selectively relinquishing control of the planned manufacturing event from the planning system to the manufacturing execution system.

4. The method of claim 1, wherein the routing step further includes the step of selectively relinquishing control of the inventory from the planning system to the distribution execution system and/or the manufacturing execution system.

5. The method of claim 1, wherein splitting logic includes sequential steps of determining whether the distribution order specifies a transfer of inventory from a manufacturing plant to a distribution warehouse, from a distribution warehouse to a manufacturing warehouse and between distribution warehouses.

6. The method of claim 5, wherein when the distribution order includes a transfer of inventory from a manufacturing plant to a distribution warehouse, control of the inventory is transferred from the planning system to the distribution execution system.

7. The method of claim 6, further comprising the step of notifying the distribution execution system of the transferred control of the inventory.

8. The method of claim 5, wherein when the distribution order includes a transfer of inventory from a distribution warehouse to a manufacturing plant, control of the inventory is transferred from the planning system to the manufacturing execution system.

9. The method of claim 8, further comprising the steps of notifying the manufacturing execution system that the transferred inventory is incoming and of notifying the distribution execution system that the transferred inventory is outgoing.

10. The method of claim 5, wherein when the distribution order includes a transfer of inventory between distribution warehouses, the method further includes the steps of generating an inventory distribution order detailing a source distribution and a destination distribution warehouse.

11. The method of claim 1, further comprising the step of storing the manufacturing plan in a manufacturing database administered by the manufacturing execution system.

12. The method of claim 1, further comprising the step of storing the distribution plan in a distribution database administered by the distribution execution system.

13. The method of claim 1, wherein the integrated manufacturing and distribution plan includes a record of recommended shipments, vehicle loads and/or corresponding planned arrival dates of the recommended shipments necessary to effectuate the distribution and/or manufacturing plans and wherein the splitting logic selectively forwards at least a portion of the record to at least one of the distribution execution system and the manufacturing execution system.

14. The method of claim 13, wherein the splitting logic forwards the record of recommended shipments and vehicle loads to the distribution execution system and forwards the corresponding planned arrival dates to the manufacturing execution system.

15. A computer system adapted to split an integrated manufacturing and distribution plan into a plan for distribution of inventory and a separate manufacturing plan, comprising:
   a planning computer system adapted to store the integrated manufacturing and distribution plan;

a manufacturing execution computer system adapted to store and execute the manufacturing plan;

a distribution execution computer system adapted to store and execute the distribution plan, and a splitter, the splitter being configured to read the integrated plan from the planning computer system, to discriminate between a planned manufacturing event and a distribution order in the integrated plan, to incorporate the planned manufacturing event directly into the manufacturing plan and to route the distribution order to at least one of the manufacturing and distribution plans according to splitting logic adapted to operate on the distribution order.

16. The computer system of claim 15, wherein the splitting logic is adapted to route the distribution order to said at least one of the manufacturing and distribution plans depending upon a source and a destination of the inventory.

17. The computer system of claim 15, wherein the splitter is further adapted to recommend that the planning computer system selectively relinquish control of the planned manufacturing event to the manufacturing execution computer system upon incorporating the planned manufacturing event into the manufacturing plan.

18. The computer system of claim 15, wherein the splitter is further adapted to recommend that the planning computer system selectively relinquish control of the inventory to the distribution execution computer system and/or the manufacturing execution computer system upon routing the distribution order to said at least one of the manufacturing and distribution plans.

19. The computer system of claim 15, wherein the splitter is further configured to carry out the sequential steps of determining whether the distribution order specifies a transfer of inventory from a manufacturing plant to a distribution warehouse, from a distribution warehouse to a manufacturing warehouse and between distribution warehouses.

20. The computer system of claim 19, wherein the splitter is further configured to recommend that the control of the inventory be transferred from the planning computer system to the distribution execution computer system when the distribution order includes a transfer of inventory from a manufacturing plant to a distribution warehouse.

21. The computer system of claim 20, wherein the splitter is further configured to notify the distribution execution computer system of the transferred control of the inventory.

22. The computer system of claim 19, wherein the splitter is further configured to recommend that the control of the inventory be transferred from the planning computer system to the manufacturing execution computer system when the distribution order includes a transfer of inventory from a distribution warehouse to a manufacturing plant.

23. The computer system of claim 22, wherein the splitter is further configured to notify the manufacturing execution computer system that the transferred inventory is incoming and to notify the distribution execution computer system that the transferred inventory is outgoing.

24. The computer system of claim 19, wherein the splitter is further configured to generate an inventory distribution order detailing a source distribution and a destination distribution warehouse when the distribution order includes a transfer of inventory between distribution warehouses.

25. The computer system of claim 15, wherein the integrated manufacturing and distribution plan includes a record of recommended shipments, vehicle loads and/or corresponding planned arrival dates of the recommended shipments necessary to effectuate the distribution and manufacturing plans and wherein the splitter is further adapted to selectively forward at least a portion of the record to at least one of the distribution execution computer system and the manufacturing execution computer system.

26. The computer system of claim 25, wherein the splitter is further adapted to forward the record of recommended shipments and/or vehicle loads to the distribution execution computer system and to forward the corresponding planned arrival dates to the manufacturing execution computer system.

27. A machine readable medium having stored thereon data representing sequences of instructions which, when executed by a computer system, causes said computer system to split an integrated manufacturing and distribution plan stored in a planning system into a plan for distribution of inventory and a separate manufacturing plan, the manufacturing plan being executable by a manufacturing execution system and the distribution plan being executable by a distribution execution system, by carrying out the steps of:

reading the integrated plan from the planning system;

discriminating between a planned manufacturing event and a distribution order in the integrated plan;

incorporating the planned manufacturing event directly into the manufacturing plan, and routing the distribution order to at least one of the manufacturing and distribution plans according to splitting logic adapted to operate on the distribution order.

28. The machine readable medium of claim 27, wherein the splitting logic routes the distribution order to said at least one of the manufacturing and distribution plans depending upon a source and a destination of the inventory.

29. The machine readable medium of claim 27, wherein the incorporating step includes the step of selectively relinquishing control of the planned manufacturing event from the planning system to the manufacturing execution system.

30. The machine readable medium of claim 27, wherein the routing step further includes the step of selectively relinquishing control of the inventory from the planning system to the distribution execution system and/or the manufacturing execution system.

31. The machine readable medium of claim 27, wherein splitting logic includes sequential steps of determining whether the distribution order specifies a transfer of inventory from a manufacturing plant to a distribution warehouse, from a distribution warehouse to a manufacturing warehouse and between distribution warehouses.

32. The machine readable medium of claim 31, wherein when the distribution order includes a transfer of inventory from a manufacturing plant to a distribution warehouse, control of the inventory is transferred from the planning system to the distribution execution system.

33. The machine readable medium of claim 32 further comprising the step of notifying the distribution execution system of the transferred control of the inventory.

34. The machine readable medium of claim 31, wherein when the distribution is order includes a transfer of inventory from a distribution warehouse to a manufacturing plant, control of the inventory is transferred from the planning system to the manufacturing execution system.

35. The machine readable medium of claim 34, further comprising the steps of notifying the manufacturing execution system that the transferred inventory is incoming and of notifying the distribution execution system that the transferred inventory is outgoing.

36. The machine readable medium of claim 31, wherein when the distribution order includes a transfer of inventory between distribution warehouses, the method further includes the steps of generating an inventory distribution order detailing a source distribution and a destination distribution warehouse.

37. The machine readable medium of claim 27, further comprising the step of storing the manufacturing plan in a manufacturing database administered by the manufacturing execution system.

38. The machine readable medium of claim 27, further comprising the step of storing the distribution plan in a distribution database administered by the distribution execution system.

39. The machine readable medium of claim 27, wherein the integrated manufacturing and distribution plan includes a record of recommended shipments, vehicle loads and/or corresponding planned arrival dates of the recommended shipments necessary to effectuate the distribution and manufacturing plans and wherein the splitting logic selectively forwards at least a portion of the record to at least one of the distribution execution system and the manufacturing execution system.

40. The machine readable medium of claim 39, wherein the splitting logic forwards the record of recommended shipments and/or vehicle loads to the distribution execution system and forwards the corresponding planned arrival dates to the manufacturing execution system.

* * * * *